No. 879,833. PATENTED FEB. 18, 1908.
O. BLAIS.
NUT LOCK.
APPLICATION FILED MAY 19, 1906.
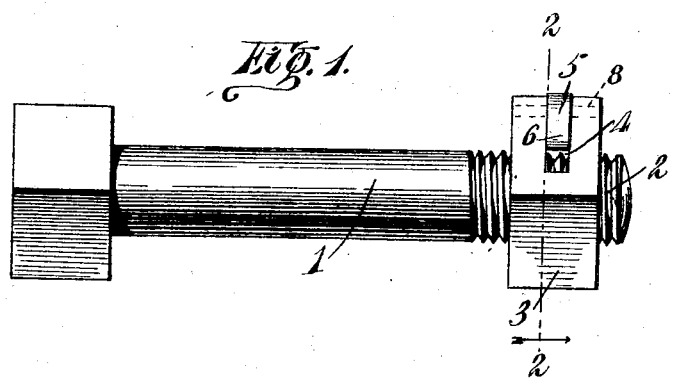
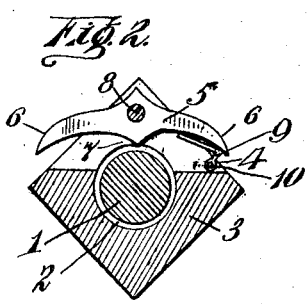
Witnesses:
Olivier Blais,
Inventor,
By Marion & Marion
Attorneys.

UNITED STATES PATENT OFFICE.

OLIVIER BLAIS, OF BROMPTONVILLE, QUEBEC, CANADA, ASSIGNOR OF ONE-HALF TO J. ELIE BILODEAU, OF BROMPTONVILLE, CANADA.

NUT-LOCK.

No. 879,833.   Specification of Letters Patent.   Patented Feb. 18, 1908.

Application filed May 19, 1906. Serial No. 317,830.

*To all whom it may concern:*

Be it known that I, OLIVIER BLAIS, a subject of the King of Great Britain, residing at Bromptonville, in the county of Richmond, Province of Quebec, Canada, have invented certain new and useful Improvements in Nut-Locks; and I do hereby declare that the following is a full, clear, and exact description of the invention, such as will enable others skilled in the art to which it appertains to make and use the same.

My invention relates to nut locks; the object of my invention is to provide a nut lock which may be operated into locked position by a wrench when the nut is being screwed on a bolt; and, which may be unlocked by a wrench when it is desired to remove the nut from the bolt; and, my invention consists of the construction, combination and arrangement of parts, as hereby illustrated, described and claimed.

In the accompanying drawings forming part of this application, I have illustrated one form of my invention in which drawings similar reference characters designate corresponding parts, and in which:

Figure 1 is a plan view of a bolt showing the application of my invention; and, Fig. 2 is a tranverse vertical section taken on line 2—2 of Fig. 1, looking in the direction indicated by the arrow, showing the device in operative position, the tooth 7 engaging the threads of the bolt.

Referring to the drawings: 1 designates a bolt having screw threads 2. Disposed on the screw threaded end of the bolt, is a nut 3 provided with a slot 4, transverse to its axis, and extending nearly to the center thereof. Disposed in the slot 4 is a dog 5 having the rounded arms 6 and a tooth 7. The dog 5 is rockably supported by means of a pin 8 fixed in one corner of the nut. Dog 5 is so mounted on pin 8 as to cause tooth 7 of said dog to swing toward the threads of the bolt nearest the pin 8 when the dog 5 is rocked.

For the purpose of maintaining the tooth 7 disengaged from the screw threads 2, I provide a spring 9, carried on a pin 10. The tension of the spring is exerted against the inner face of one of the arms 6 so that this arm is normally held elevated and the tooth is inoperative. With the arms 6 and tooth 7 in this position the nut is screwed home. When once seated the elevated arm is struck with a hammer or the like, and driven toward the bolt, thereby driving the tooth 7 forcibly into engagement with the screw threads of the bolt and so locking the nut and bolt together. To unlock the nut, it is simply necessary to strike the opposite arm 6 and so disengage the tooth 7 from the thread of the bolt.

Having described my invention what I claim and desire to secure by Letters Patent is:

1. A nut lock, comprising a nut provided with a slot therein, a dog pivotally mounted within said slot and adapted to engage the threads of a bolt passing through said nut to thereby lock said nut upon said bolt, oppositely disposed arms extending from the dog, and projecting through and beyond adjacent faces of the aforesaid nut, a tooth on said dog adapted to be forced into operative engagement with the threads of a bolt, a spring within said slot and bearing upon the inner face of one of the aforesaid arms to thereby maintain the tooth normally disengaged from the threads of said bolt and the other of said arms being adapted to act as a lever whereby said tooth may be forced out of engagement with the threads of the aforesaid bolt to thereby allow rotation of the nut.

2. A nut lock comprising a nut provided with a slot extending horizontally substantially half way through said nut from corner to corner diagonally, a dog pivotally mounted within said slot adjacent the slotted corner of the nut, arms projecting in opposite directions from said dog through said slot and extending through and beyond adjacent faces of said nut, a tooth on said dog intermediate the ends of said arms adapted to engage the threads of a bolt passing through said nut to thereby lock said nut against rotation on said bolt, a spring mounted within said slot and bearing upon the inner face of one of said arms and thereby acting to maintain the tooth in inoperative position or disengagement with the threads of said bolt, and the other of said arms acting as a lever whereby said tooth may be forced out of locking engagement with the threads of the bolt after it has previously been forced into engagement with the same.

In witness whereof I have hereunto set my hand in the presence of two witnesses.

OLIVIER $\overset{\text{his}}{\underset{\text{mark}}{\times}}$ BLAIS.

Witnesses:
A. JONCAS,
C. E. DAVIS.